US006112837A

United States Patent [19]
Kanno et al.

[11] Patent Number: 6,112,837

[45] Date of Patent: Sep. 5, 2000

[54] MANUALLY OPERATED, MOTOR ASSISTED WHEELCHAIR

[75] Inventors: Nobuyuki Kanno; Hiroshi Tanaka, both of Iwata, Japan

[73] Assignee: Yamaha Hatsudoki Kabushiki Kaisha, Iwata, Japan

[21] Appl. No.: 08/937,134

[22] Filed: Sep. 24, 1997

[30] Foreign Application Priority Data

Sep. 30, 1996 [JP] Japan .................................... 8-259947

[51] Int. Cl.[7] ...................................................... B62D 11/04

[52] U.S. Cl. .......................... 180/6.5; 180/65.2; 180/907; 73/1.09; 73/862.53

[58] Field of Search .................................... 180/907, 65.1, 180/65.2, 65.8, 6.5; 73/1.09, 1.11, 1.15, 862.625, 862.53, 862.46, 498, 499, 502, 901, 862.27, 862.57, 379.08, 379.01, 379.07; 356/6; 340/438, 425.5, 870.04; 362/800, 802

[56] References Cited

U.S. PATENT DOCUMENTS 4,395,920 8/1983 Kurton et al. ........................ 73/862.64
5,031,455 7/1991 Cline .................................... 73/379.07
5,234,066 8/1993 Ahsing et al. ........................... 180/6.5
5,248,007 9/1993 Watkins et al. ......................... 180/907
5,257,540 11/1993 Bower et al. ........................ 73/379.07
5,648,708 7/1997 Littlejohn ................................ 180/907
5,771,988 6/1998 Kikutani et al. ....................... 180/65.5
5,818,189 10/1998 Uchiyama et al. ..................... 180/907

FOREIGN PATENT DOCUMENTS 0687454 12/1995 European Pat. Off. .
2061197 5/1981 United Kingdom .

OTHER PUBLICATIONS

European Search Report dated Nov. 2, 1998.

*Primary Examiner*—Anne Marie Boehler
*Attorney, Agent, or Firm*—Knobbe, Martens, Olson & Bear LLP

[57] ABSTRACT

A wheelchair having an electric motor power assist controlled by a sensor that senses the manual force applied by a rider to the hand rim. An arrangement is provided for facilitating adjustment of the sensor so as to permit accurate adjustment without requiring special tools or gages. This mechanism includes an LED that outputs a signal when the sensor signal output is zero. In addition, an arrangement is provided for facilitating the adjustment of the spring and also for ensuring that the hand rim is axially located so as to preclude cocking and binding.

23 Claims, 14 Drawing Sheets

MANUALLY OPERATED, MOTOR ASSISTED WHEELCHAIR

BACKGROUND OF THE INVENTION

This invention relates to a manually operated, power assisted vehicle such as a wheelchair and more particularly to an improved control arrangement therefor.

A wide variety of types of vehicles have been proposed that are designed to be operated primarily by manual power. Although these vehicles are primarily land vehicles, the same concept can be applied to vehicles traveling over other types of terrain, for example, water.

For a variety of reasons, it has also been proposed to provide a prime mover assist for these vehicles. One very popular and successful type of vehicle of this nature employs an arrangement wherein the amount of power assists supplied is dependent upon the degree or presence of manual power asserted by the vehicle occupant. There are a number of advantages of this type of vehicle.

First, by ensuring that the power assist is provided only in response to a manual power input force, a certain degree of safety is assured. Furthermore, this type of vehicle permits the rider to obtain physical exercise at the same time he is traveling. Finally, this type of system has an advantage for disabled or physically challenged persons because they will still have the psychological assurance that they are able to travel by themselves.

In order to obtain this type of control, some sensor must be employed in the vehicle that senses the actual force applied by the rider or occupant. Frequently, potentiometers are utilized as the sensors although other types of sensors may be employed. Potentiometers are frequently used where the prime mover is an electric motor, although the application is not so limited.

As with all control systems, the sensor has a null or dead band area wherein some degree of movement is provided without the resulting output of a signal. This means that the sensor must be relatively accurate. This also means that the sensor must be relatively accurately positioned with respect to the component with which it cooperates so that this dead band does not cause improper functioning of the total control system.

Although these types of adjustments can be easily made at the factory where the component is manufactured, difficulties arise in connection with either the servicing or the periodic adjustment of the system when it is in use by the owner. The necessity for facilitating and simplifying the adjustment is particularly important when the user is a disadvantaged or physically challenged person.

It is, therefore, a principle object of this invention to provide an improved manually operated, power assisted vehicle.

It is a further object of this invention to provide an improved force sensor and mounting and adjustment mechanism for such a type of vehicle.

It is a still further object of this invention to provide an improved adjusting mechanism for the force sensor of such a vehicle wherein the number of tools and instruments required to make adjustment are minimized.

It is a yet further object of this invention to provide an improved sensor and adjustment mechanism that can be easily adjusted by the user even while in the vehicle.

Because of its excellent applicability to utilization by disabled persons, the type of power assisted, manually operated system described is frequently employed in conjunction with wheelchairs.

To apply this system to a wheelchair, it is desirable to associate the force sensor with the hand rim that the occupant of the wheelchair normally uses for manual propulsion. In other words, the hand rim is mounted for limited relative rotation relative to the associated wheel. This degree of relative rotation is utilized in conjunction with a spring and sensor so as to provide a way of sensing of the manual input force.

It is, therefore, a still further object of this invention to provide an improved force sensor and adjustment mechanism therefor that can be utilized with the hand rim of a power assisted wheelchair.

The wheelchair presents certain particular problems in connection with the coupling of the hand rim to the wheel and particularly where the hand rim is rotatable to a limited extent relative to the wheel. Obviously, the hand rim and wheel have fairly large diameters. The operator, by the very nature of the mechanism, applies not only a circumferential force to the hand rim but also a force that acts normally to the axis of rotation. This force acts through a fairly large moment arm and thus can put bending forces on the hand rim. These can cause difficulties to occur in the transmission of the forces to the sensor and can also cause binding when the system is being operated.

It is, therefore, a still further object of this invention to provide an improved connection and bearing arrangement for the hand rim of a wheelchair utilizing a power assist mechanism and associated sensor.

SUMMARY OF THE INVENTION

A first feature of this invention is adapted to be embodied in a manually powered, prime mover assisted vehicle that is comprised of a body portion that is adapted to accommodate at least one rider. A driving element is carried by the body portion and is cooperable with the terrain over which the vehicle travels for generating a driving force through cooperation with the terrain. A manual input force device is carried by the body portion for receiving a manual force applied by a rider of the vehicle. A first transmission couples the manual force input device to the driving element for manually powering the vehicle along the terrain. A primer mover is also carried by the body portion and drives the driving element through a second transmission for providing a power assist to the manual input force. A manual force sensor is provided for sensing the manual force applied by the rider to the manual force input device. A control operates the primer mover in response to the sensed manual force for controlling the primer mover to provide a controlled degree of power assist for powering the vehicle. The manual force sensor has a null or dead band area and is detachably mounted to the component of the vehicle with which it is associated. A display arrangement is carried by the vehicle for providing an indication when the manual force sensor is mounted in the desired null point position on its supporting component for facilitating adjustment thereof.

The wheelchair presents certain particular problems in connection with the coupling of the hand rim to the wheel and particularly where the hand rim is rotatable to a limited extent relative to the wheel. Obviously, the hand rim and wheel have fairly large diameters. The operator, by the very nature of the mechanism, applies not only a circumferential force to the hand rim but also a force that acts normally to the axis of rotation. This force acts through a fairly large moment arm and thus can put bending forces on the hand rim. These can cause difficulties to occur in the transmission of the forces to the sensor and can also cause binding when the system is being operated.

It is, therefore, a still further object of this invention to provide an improved connection and bearing arrangement for the hand rim of a wheelchair utilizing a power assist mechanism and associated sensor.

SUMMARY OF THE INVENTION

A first feature of this invention is adapted to be embodied in a manually powered, prime mover assisted vehicle that is comprised of a body portion that is adapted to accommodate at least one rider. A driving element is carried by the body portion and is cooperable with the terrain over which the vehicle travels for generating a driving force through cooperation with the terrain. A manual input force device is carried by the body portion for receiving a manual force applied by a rider of the vehicle. A first transmission couples the manual force input device to the driving element for manually powering the vehicle along the terrain. A primer mover is also carried by the body portion and drives the driving element through a second transmission for providing a power assist to the manual input force. A manual force sensor is provided for sensing the manual force applied by the rider to the manual force input device. A control operates the primer mover in response to the sensed manual force for controlling the primer mover to provide a controlled degree of power assist for powering the vehicle. The manual force sensor has a null or dead band area and is detachably mounted to the component of the vehicle with which it is associated. A display arrangement is carried by the vehicle for providing an indication when the manual force sensor is mounted in the desired null point position on its supporting component for facilitating adjustment thereof.

Another feature of the invention is adapted to be embodied in a mounting arrangement for the hand rim of a wheelchair that may be powered by a power assist system of the type described in the preceding paragraph. This vehicle includes a ground engaging wheel and a hand rim that is supported for limited rotation relative to the wheel for receiving a manual input force for rotating the wheel. A plurality of circumferentially spaced, axially adjustable bearing elements are spaced around the wheel and engage the hand rim for limiting its deflection in a direction parallel to the axis of rotation of the hand rim and the wheel.

DETAILED DESCRIPTION OF THE PREFERRED EMBODIMENT OF THE INVENTION

Figure 1:
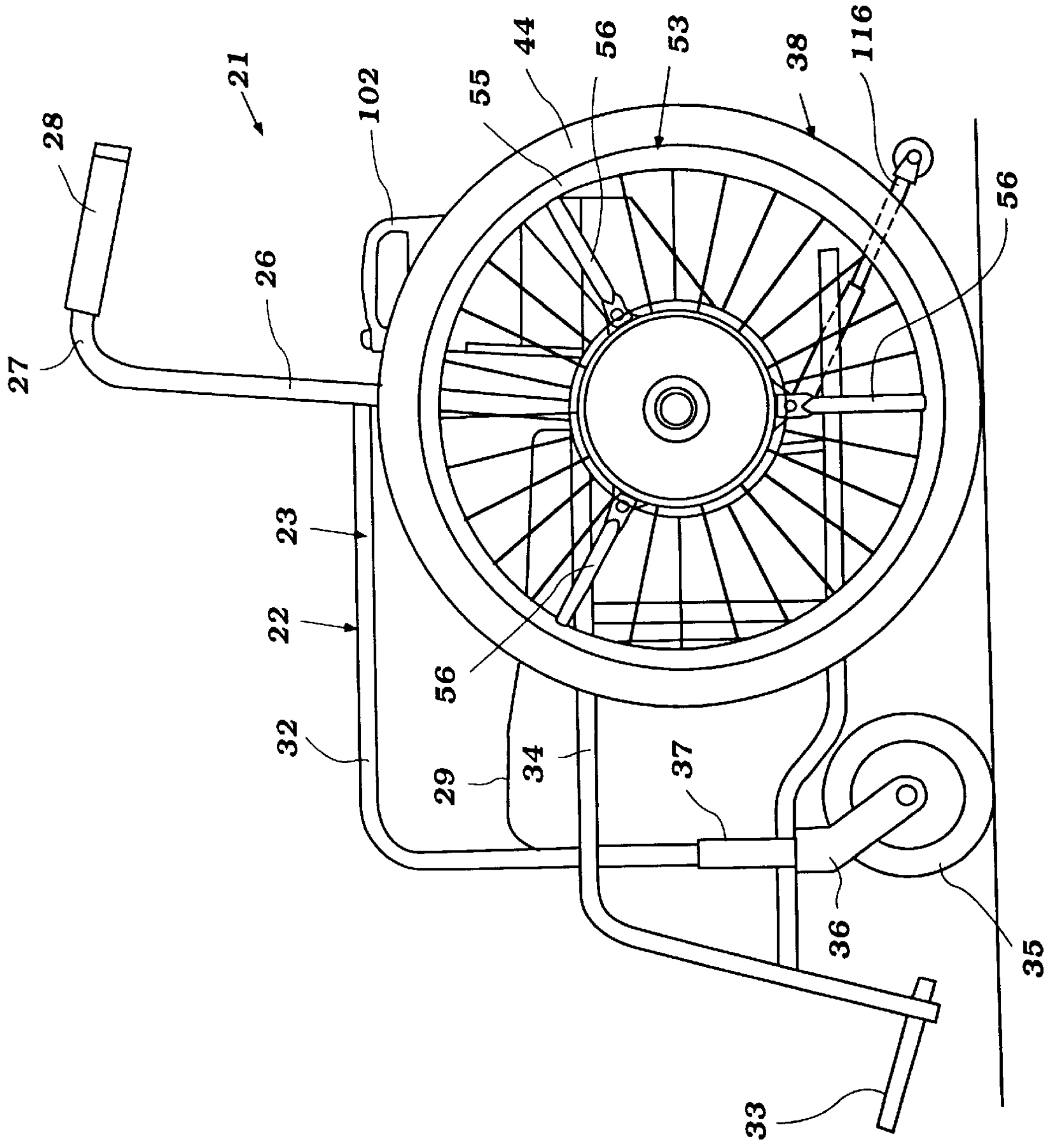
FIG. 1 is a side elevational view of a wheelchair constructed and operated in accordance with an embodiment of the invention.
Figure 2:
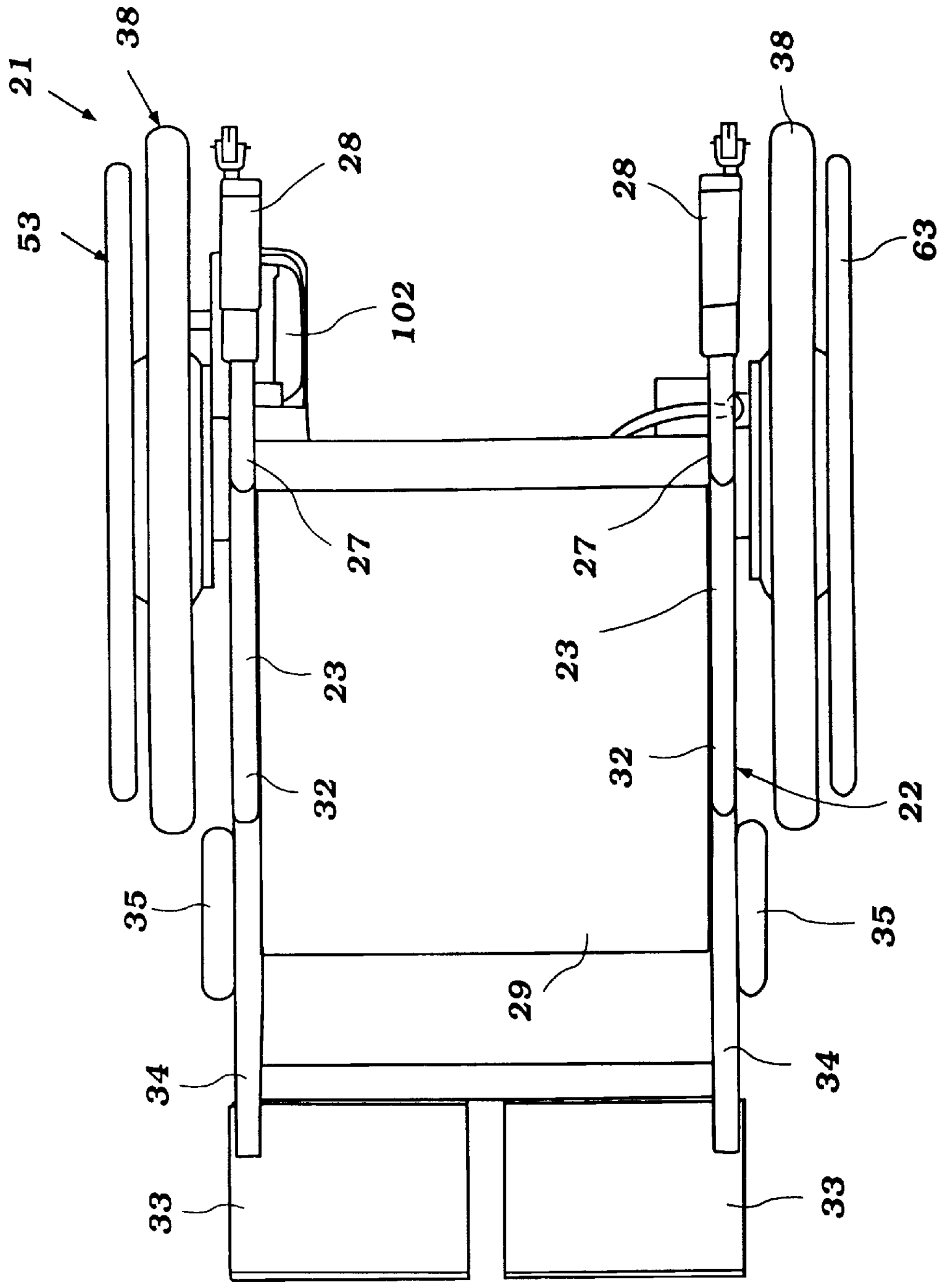
FIG. 2 is a top plan view of the wheelchair.
Figure 3:
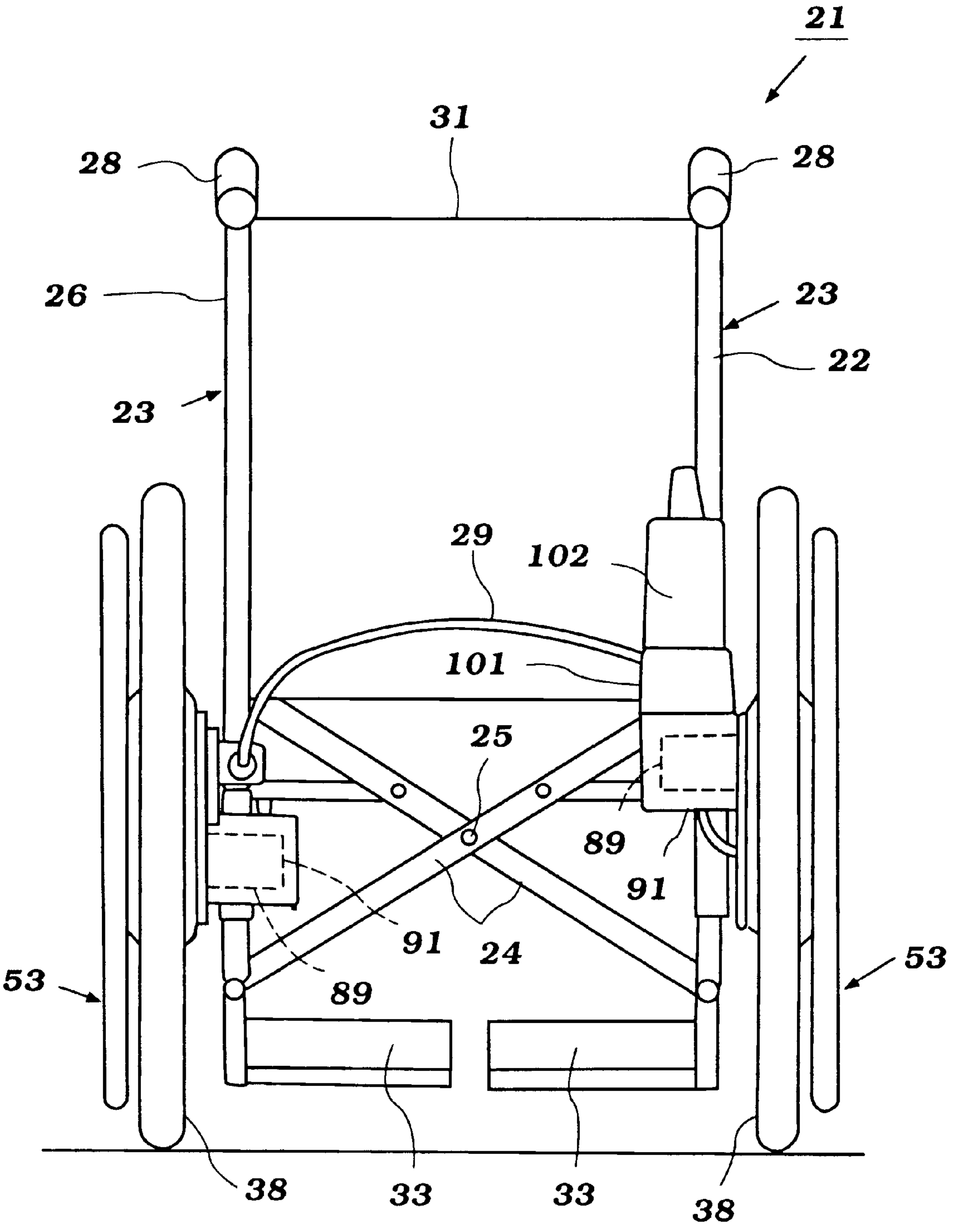
FIG. 3 is a rear elevational view of the wheelchair.

Referring now in detail to the drawings and initially to FIGS. 1–3, a foldable wheelchair constructed in accordance with an embodiment of the invention is identified generally by the reference numeral 21.

The foldable wheelchair 21 is comprised of a folding frame assembly, indicated generally by the reference numeral 22 which is comprised of a pair of tubular side frame members, each indicated by the reference numeral 23 and which have a generally h-shaped configuration in side elevation. These side frame members 23 are connected to each other by a scissors-type linkage system, comprised of a pair of links 24 pivotally connected to each other by a pivot pin 25. There is preferably a rear pair of links at the rear of the side frame members 23 and a front pair of links at the front of the side frame members 23.

The links 24 have pivotal connections at one of their ends to the side frame members 23 and sliding connections at their other ends to the side frame members 23 as is well known in this art. A suitable locking mechanism (not shown) may be provided for holding the side frame members 23 in their extended operative position as shown in the Figures and/or in their retracted storage or transportation position.

Upstanding legs 26 of the side frame members 23 are formed with integral push handles 27 which carry hand grips 28 at their upper ends so that an assistant or helper may push the wheelchair 21.

A canvas seat strap 29 and back strap 31 are connected at their ends to the side frame members 23 and handle portions 26, respectively, so as to accommodate a seated rider. These seat and back portions 29 and 31 are flexible so as to fold upon folding of the wheelchair 21.

Arm rests 32 are formed by horizontal parts of the side frame members 23 so as to support the seated occupant's arms. Foot rests 33 are connected to lower legs 34 of the side frame members 23 so as to accommodate the rider's feet. These foot rests also may be pivotal from their operative positions to storage positions, as is well known in this art.

A pair of front wheels 35 are connected by caster assemblies 36 to a further portion 37 of the side frame members 23 immediately to the rear of the foot rests 33. In addition, large rear wheels 38 are journaled by the side frame members 23 via a detachable connection, in a manner to be described, at the rear of the frame assembly and generally in line with the tubular portions 26.

The construction of the wheelchair 21 as thus far described may be considered to be conventional and as such forms no part of the invention, other than representing the environment in which the invention may be practiced. Therefore, where any component of the wheelchair 21 is not described in detail, any conventional construction may be utilized. Also, from the following description, those skilled in the art will readily understand how the invention may be applied not only to a wide variety of types of wheelchairs, but also that certain aspects may be applied to other types of manually-powered vehicles, both land and water.

The detachable support and journal for the rear wheels 38 and the drive therefor are generally as described in the copending application entitled "Electric Power-Assisted Wheelchair" U.S. Ser. No. 08/798,273, filed Feb. 14, 1997 and assigned to the assignee hereof. Alternatively any other type of drive and wheel arrangement may be used in connection with the invention.

However for the ease of understanding the invention a portion of this structure will now be described by primary reference to FIGS. 4–8 with the initial description being directed primarily to FIGS. 5 and 6. Where any details are not shown or described, those skilled in the art will readily understand from this description how the invention may be practiced.

Each wheel assembly 38 and the drive therefor has substantially the same configuration except for its orientation as mounted to the frame 22. For that reason, only one wheel will be described in detail. Each wheel 38 includes a hub portion 39 which is mounted on the frame assembly 22 by a suitable detachable connection. This hub portion 39 has an integral outer area 41 to which one end of spokes 42 are laced in any suitable manner. These spokes 42 extend radially outwardly and are connected also by a lacing arrangement to an outer rim 43 that carries a tire 44.

A backing plate assembly, indicated generally by the reference numeral 45, has a central part that receives a support shaft 46 which support pin extends into the inner part of the wheel hub 39. Anti-friction bearings 47 rotatably journal the hub 39 on this shaft 46. A sleeve 48 is disposed between the bearings 47 to hold their spaced relationship.

A nut 49 is threaded onto the outer end of the shaft 46 so as to hold the assembly together in an axial direction. The nut 49 in effect holds the backing plate 45 against a shoulder formed on the shaft 46. On the other side of the shoulder, the shaft 46 detacheably extends into a bushing 51 that is affixed to the frame assembly 22 in any suitable manner.

A detent locking mechanism of a suitable type including a hub cap 52 is provided for detachably affixing the shaft 46 and, accordingly, the backing plate 45 and wheel 38 to the frame assembly 22. The backing plate 45 is also suitably held against rotation.

A hand rim 53 is carried on the outer side of the wheel 38 in a manner which will be described. This hand rim 53 includes a cover piece 54 that has a central opening that is aligned with the hub cap 52 and into which it extends.

The way in which the hand rim 53 is connected for rotation with the respective wheel 38 will now be described by reference primarily to FIGS. 4 and 5. The hand wheel 53 has a circular rim portion 55 that is provided with three radially inwardly extending spokes 56 which are formed from a tubular sheet metal construction. The inner ends of these spokes 56 are flattened so as to be affixed by threaded fasteners 57 to lugs 58 of a hub member 59. The hub member 59 is connected to the wheel hub 39 and specifically an annular portion of it by means of a lost motion biasing connection.

This lost motion biasing connection is actually comprised of three assemblies that are spaced around the hubs 59 and 39 and in spaced relationship between the spokes 56 that connect the hand rim 55 to its hub 59. These assemblies will be described shortly.

An elastic seal 61 is provided between the hand wheel hub 59 and the outer hub portion 41 of the wheel assembly 38. This provides axial location of the hand rim assembly 53 relative to the main wheel 38 and will provide some vibration damping in addition to sealing the internal area from foreign elements.

Figure 4:
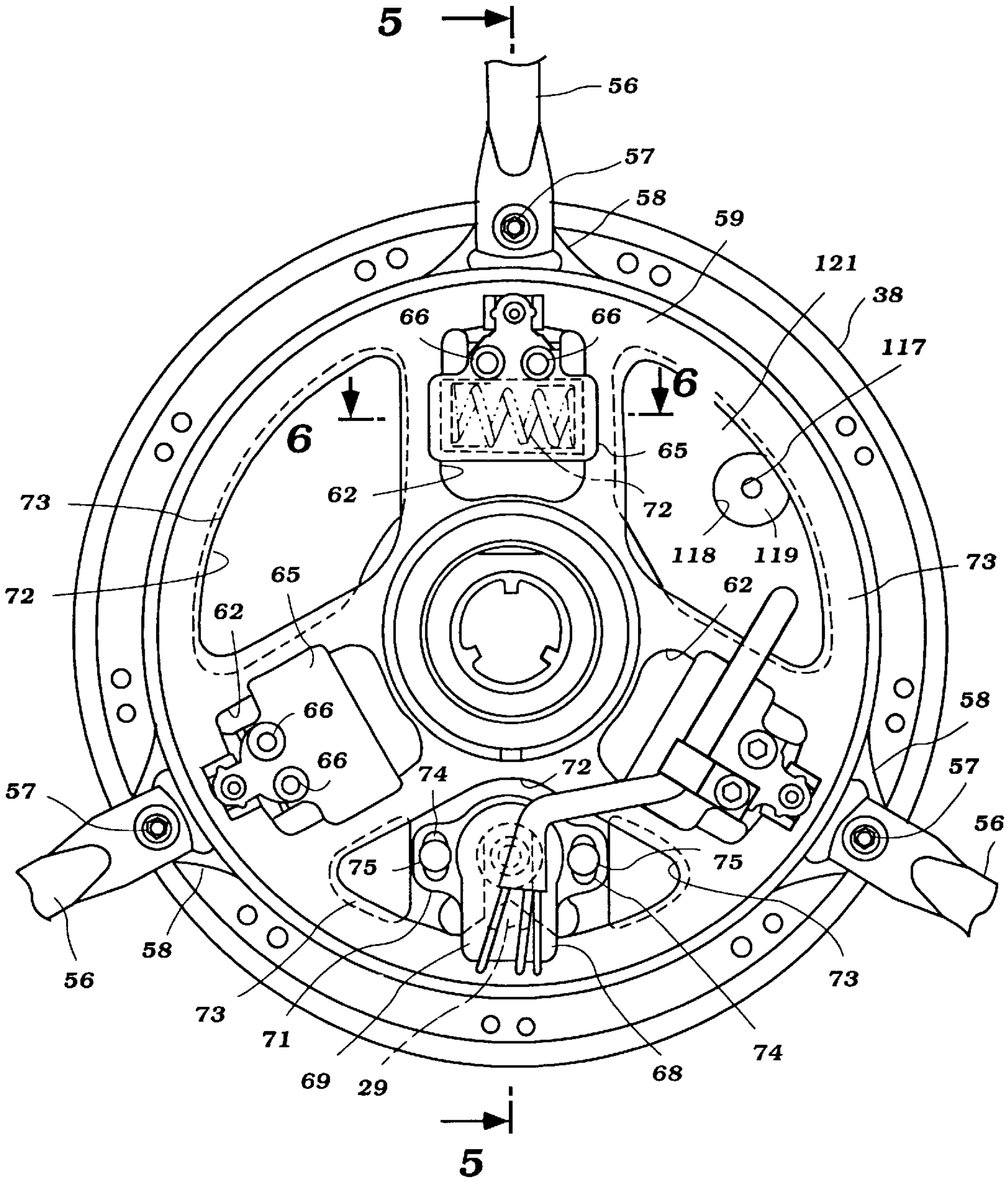
FIG. 4 is a side elevational view of one of the wheels and particularly the torque-sensing arrangement with the cover removed and showing only the hub portion.
Figure 5:
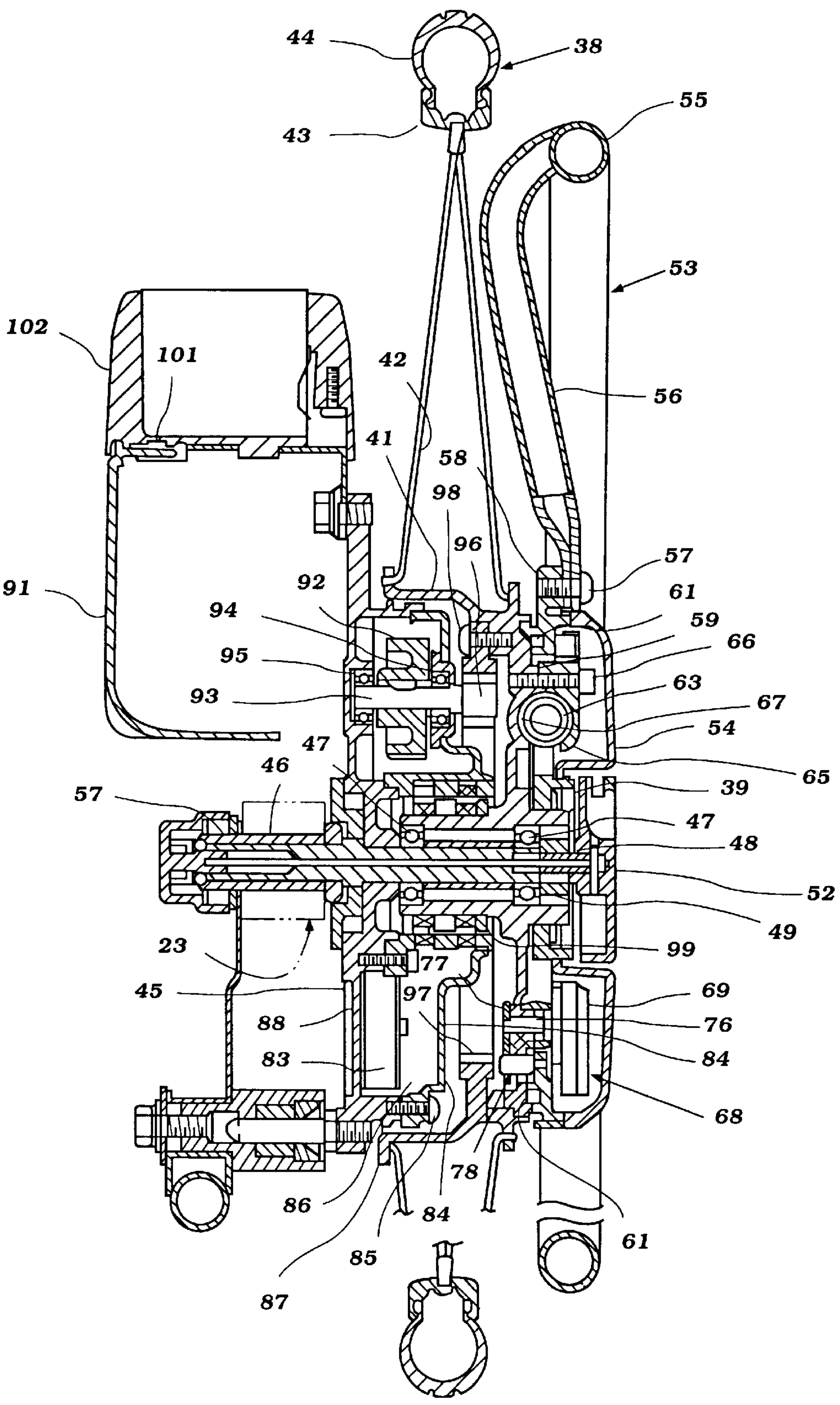
FIG. 5 is a cross-sectional view of the entire wheel and is taken along the line 5—5 of FIG. 4.
Figure 6:
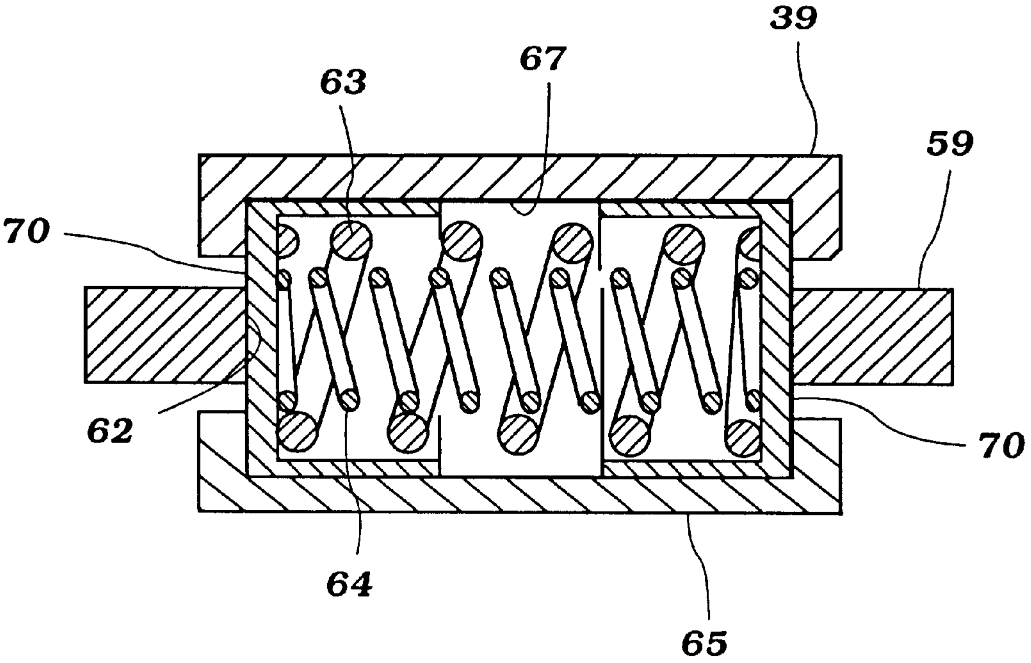
FIG. 6 is an enlarged cross-sectional view taken along the line 6—6 of FIG. 4 showing the centering arrangement and a portion of the torque sensor in a neutral state.
Figure 7:
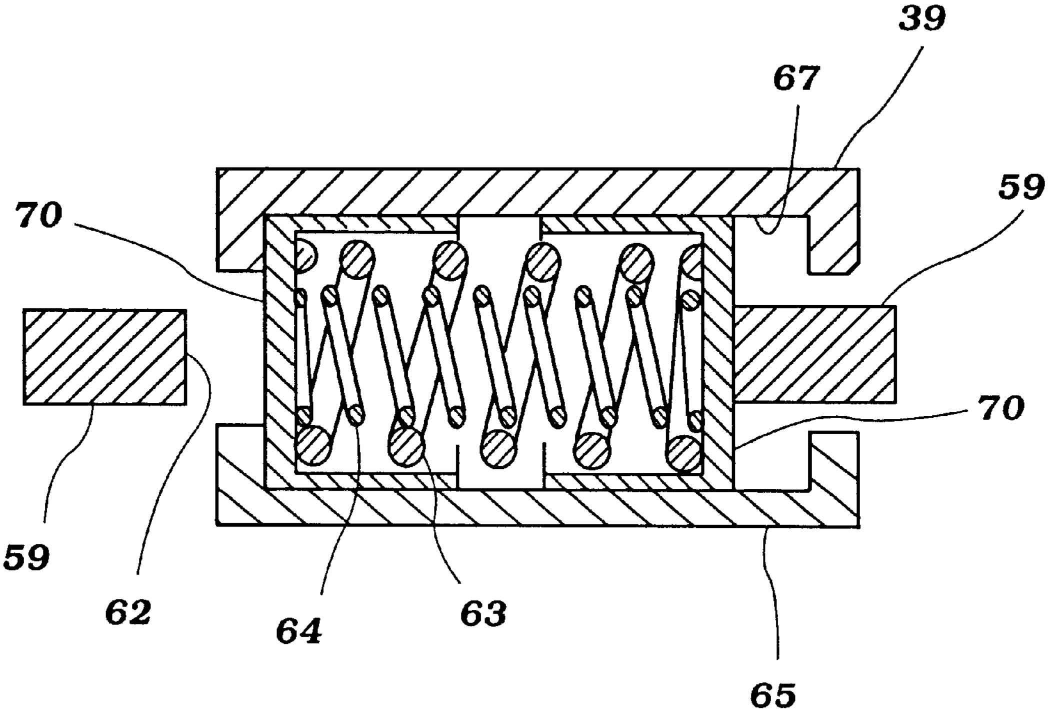
FIG. 7 is an enlarged cross-sectional view, in part similar to FIG. 6, and shows the device when an operator is applying a manual force to propel the vehicle.

The lost motion connections which are utilized in connection with the sensing of the force applied by the rider to the hand rim 53 is shown best also in FIGS. 4 and 5 as well as FIGS. 6 and 7. It should be noted that the hand rim hub 59 is provided with three circumferentially spaced windows 62. In each of these windows, a pair of coil compression springs 63 and 64 is positioned. The springs 63 and 64 is held axially relative to the wheel assembly 38 by means of spring retainers 65 which extend radially across and span these windows. The spring retainers are held in place by fasteners 66 and cooperate with pockets 67 formed in the hub portion 39 to confine the springs 63 and 64.

The ends of the springs 63 and 64 are received in spring receivers 70. The spring receivers 70 are urged by the springs 63 and 64 against shoulder lugs formed by the hand wheel portion 59 along the edges of the openings 62. The method of positioning the springs will be described later by reference to FIG. 18.

When the rider applies pressure to the hand rim 55, it will tend to rotate about a bearing surface provided by the wheel hub 39. Rotation in one direction or the other will cause a respective one of the hand wheel hub shoulders to urge the adjacent spring receiver 70 so as to compress the springs 63 and 64 against the pocket 67 of the wheel rim 39 and the retained plate 65 at the other end (FIG. 7). As will be described in more detail later, the spring 64 is compressed first and later the springs 63 and 64 are both compressed.

The wheel 38 will not initially rotated due to inertia and the degree of compression of the springs 63 and 64 before rotation begins will be an indication of the manual force applied by the rider to the rim 55. The lost motion continues after the wheelchair 21 is in motion. Thus the degree of relative rotation will always provide the necessary force signal for the power assist operation to be described later.

In order to provide a usable source of information as to the torque or force which the operator has placed on each of the hand rims 55, a potentiometer assembly, indicated generally by the reference numeral 68 is provided. This potentiometer unit 68 outputs a signal that is indicative of the degree of rotation of the hand wheel 53 relative to the main wheel 38. This is in effect, equal to the degree of compression of the springs 63 and 64. This potentiometer construction is also shown best in FIGS. 4 and 5 and will be described by reference to those figures.

The potentiometer 68 is comprised of a potentiometer element 69 that contains a typical type of potentiometer mechanism such as a wound resistor and wiper arm. The housing 69 is mounted in the wheel hub 39 by a mounting assembly 71 that permits adjustment of the rotary position of the potentiometer 68 for null setting in a manner to be described later.

The potentiometer unit 68 is mounted in proximity to and accessible through an opening or window 72 that is formed in the hub portion 59 of the hand wheel assembly 58 but is actually affixed within an opening or window 73 formed in the wheel hub 39. That is, the potentiometer 68 is fixed relative to the hub 39 of the wheel 38 and not directly to the hand wheel portion 59. Thus, the windows 72 and 73 are sized adequately so as to permit the relative movement necessary to compress the springs 63 and 64 without interference between the hand wheel hub 59 and the potentiometer housing 68.

The adjustable mounting assembly includes slots 74 formed in the mounting member 71 and threaded fasteners 75 that provide the direct attachment of the potentiometer 68 to the wheel hub 39. The slot 74 has sufficient length and shape so as to permit null point adjustment of the potentiometer 68 in a manner which, as has already been noted, will be described later.

A shaft 76 of the potentiometer element extends outwardly of the housing and carries a lever arm 77. The lever arm 77, in turn, has a slot that receives a pin 78 affixed to the hand wheel hub 59. Relative rotation between the hand wheel 53 and the ground engaging wheel 38 will therefore effect rotation of the potentiometer shaft 76 and provide a signal indicative of the relative rotation and hence the force that the rider applies to the hand wheel 53.

As should be readily apparent, the rider's application of a force to the hand wheel 53 in addition to placing a rotary torque on the hand wheel 53 will also, almost inherently, provide some axial torque on the hand wheel rim 55. This will tend to cause cocking of the hand wheel 53 relative to the wheel hub 39. The seal 61 will resist this movement in one direction, but there is, at least insofar as presently described, no arrangement for resisting the movement in the opposite direction.

Figure 8:
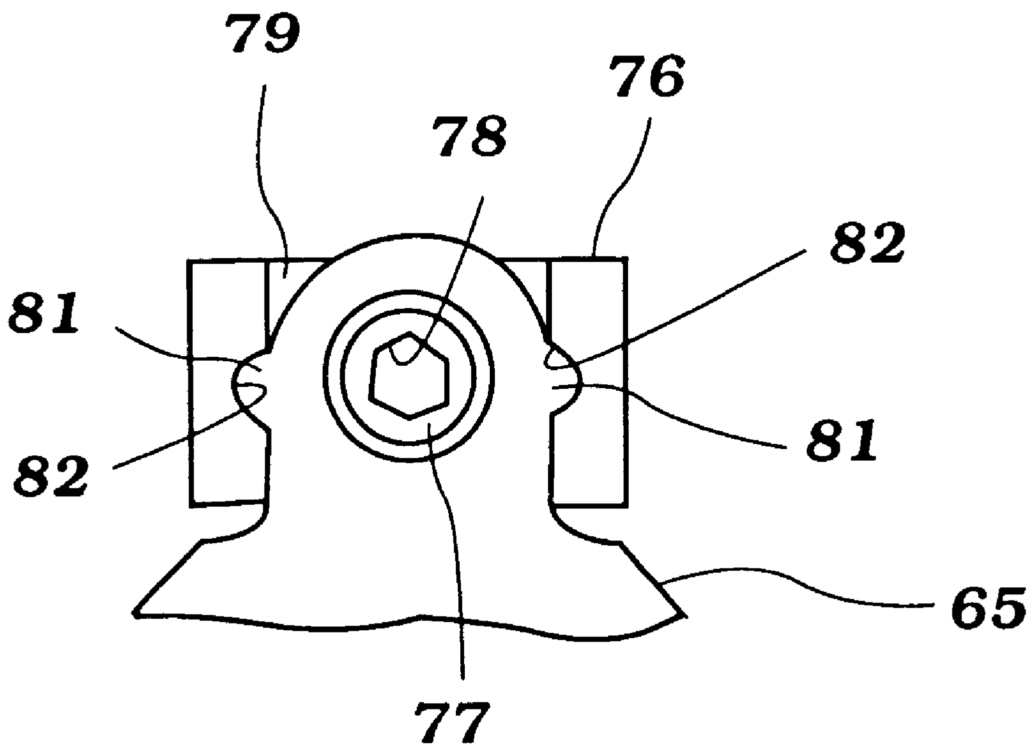
FIG. 8 is a view looking generally in the direction of the arrow 8 in FIG. 9 and show the anti-wobble bearing arrangement for the hand rim.
Figure 9:
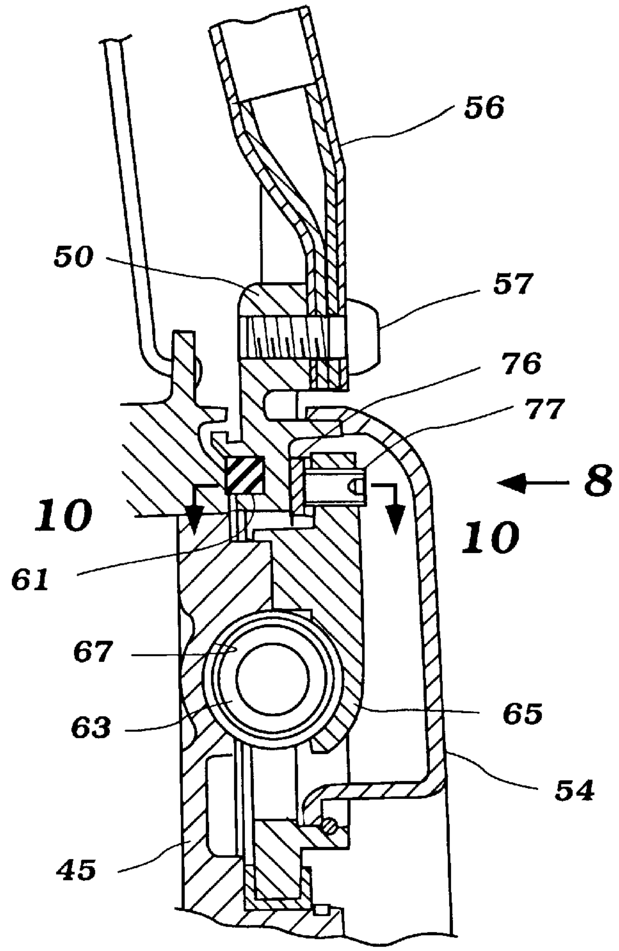
FIG. 9 is an enlarged cross-sectional view taken along the same plane of FIG. 5 but showing the anti-wobble bearing arrangement in more detail.
Figure 10:
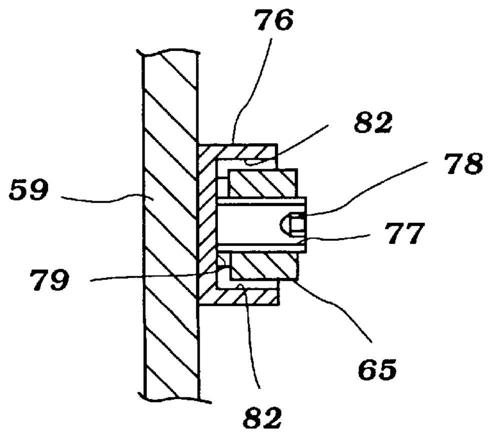
FIG. 10 is a cross-sectional view taken along the line 10—10 of FIG. 9.

This opposite direction movement is resisted by a plurality of adjustable bearing elements shown best in FIGS. 8 through 10 and which will be described by reference thereto. These bearing elements are comprised of generally U-shaped bearing members 76 carried in a manner to be described, which engage the side of the hand wheel hub 59 opposite to that engaged by the seal 61. These bearing members 76 may be formed from nylon or some other suitable wear resisting and anti-friction material.

The spring retainers 65 each are provided with a tapped opening in which an adjusting screw 77 is received. This adjusting screw 77 has a socket head 78 so as to receive an appropriate tool so it can be threaded in and out of the retainer member 65.

The bearing members 76 have an opening 79 into which a projecting portion of the spring retainer 65 extends. This extending portion has a pair of lugs 81 that will be positioned so as to preclude displacement of the bearing members 76 and the bearing members 76 may be formed with slots 82 that are complementary to the lugs 81 so as to prevent their cocking while permitting the axial movement of the bearing member 76 relative to the hand wheel hub 59.

Preferably, the adjustment is such that the degree of axial movement of the hub 59 of the hand wheel is precluded without putting undue drag on the assembly.

Figure 15:
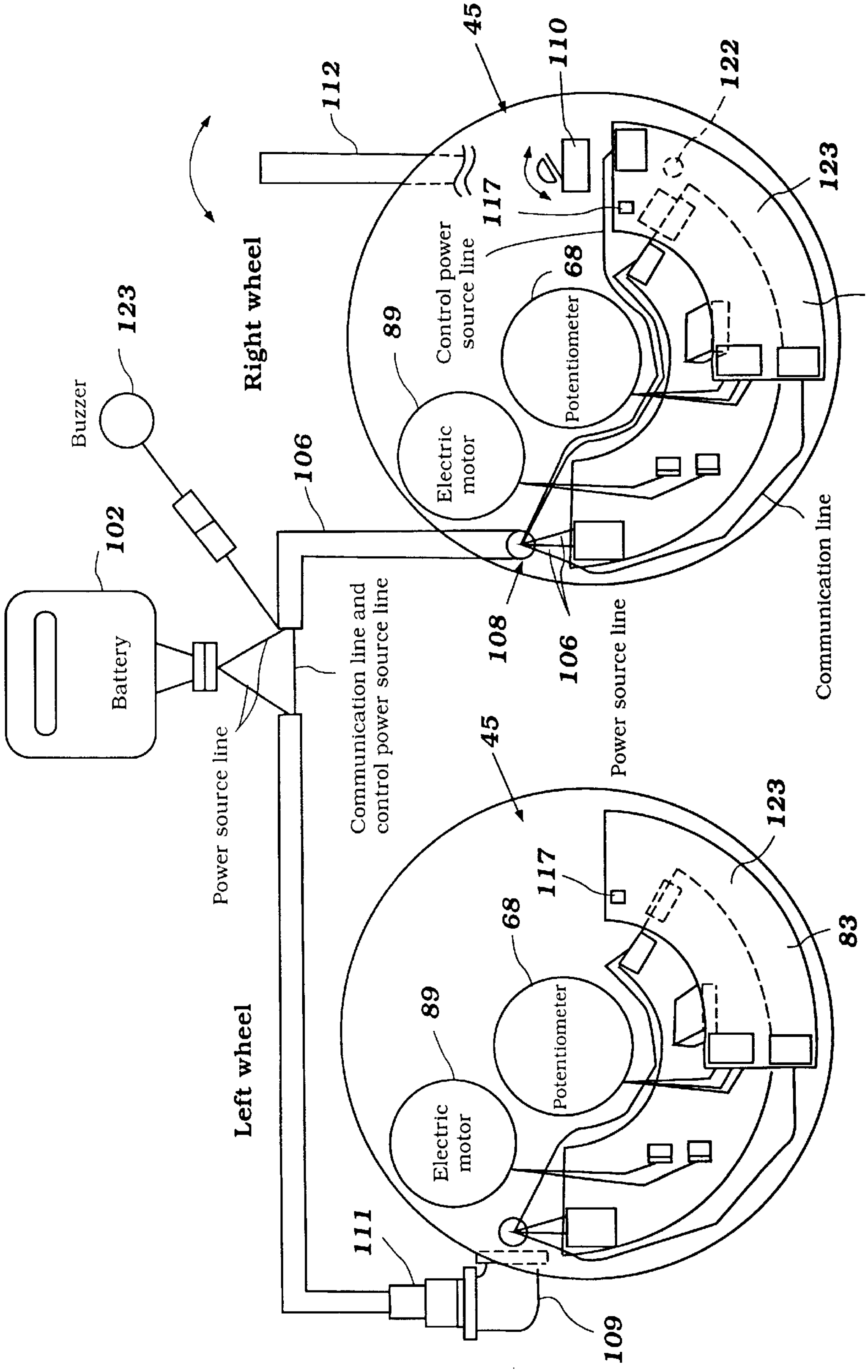
FIG. 15 is a partially schematic view showing the relationship between the various electrical elements and the two driven wheels of the wheelchair.

As will become apparent by description to FIG. 15 which shows the electrical circuitry, the output from the potentiometer 68 is transmitted to a controller, indicated generally by the reference numeral 83 and which is axially displaced from the potentiometer assembly 68. The controller 83 is provided in a cavity formed in the backing plate 45 and which is closed by a cover plate 84 so as to effect sealing therebetween. The cover plate 84 is held in place by threaded fasteners 85. The cavity enclosed by the cover is indicated at 86.

The threaded fasteners 85 are threaded into bosses 87 formed on the backing plate. In order to maintain low temperature for the controller 83, the backing plate is provided with a plurality of grooves 88 which in effect form heat radiating ribs therebetween so as to assist in the dissipation of heat.

The output from the controller 83 is transmitted to an electric motor that provides an electric power assist to the wheel 38 through a transmission. The motor is indicated by the reference numeral 89 (FIGS. 3 and 15). The motor 89 drives the wheel 38 through a transmission which will be described by particular reference to FIG. 5.

The electric motor 89 is basically a DC motor of any known type which is reversible and which has an outer housing mounted suitably on the respective backing plate 45 in a housing assembly 91. As may be seen in FIG. 3 the motor mountings on the respective backing plates 45 are staggered to permit a more compact construction when the wheel chair 21 is folded.

The motor 89 has a motor output shaft which extends into a transmission cavity in which a step down transmission (not shown) is positioned. This drives a drive belt which is also not shown. The drive belt, in turn, drives a driven pulley 92 which is keyed for rotation to a shaft 93 that is journaled in bearings 94 and 95 carried by the cover plate 84 and backing plate 45, respectively.

A gear 96 is formed integrally with the shaft 93 and drives a ring gear 97 that is affixed for rotation with the wheel rim 41 so as to establish a driving relationship therebetween. This ring gear 97 is fixed to the rim by fasteners 98. The transmission as thus far described provides a substantial step down in speed from the speed of the electric motor output shaft to the speed of rotation of the wheel 38 so as to provide a force application in addition to the speed reduction.

It has been noted that the output signal from the potentiometer 68 is transmitted to the controller 83. Since the potentiometer 68 is mounted for rotation the main wheels 38 and the controller 83 is fixed, a rotary-type connection, indicated by the reference numeral 99 is provided for transmitting the signals via this path. This connection 99 includes outer members that are fixed to the backing plate 45 and cooperating inner wipers that are fixed for rotation with the wheel hub 39. As a result, the transmission of electrical signals is possible.

Figure 11:
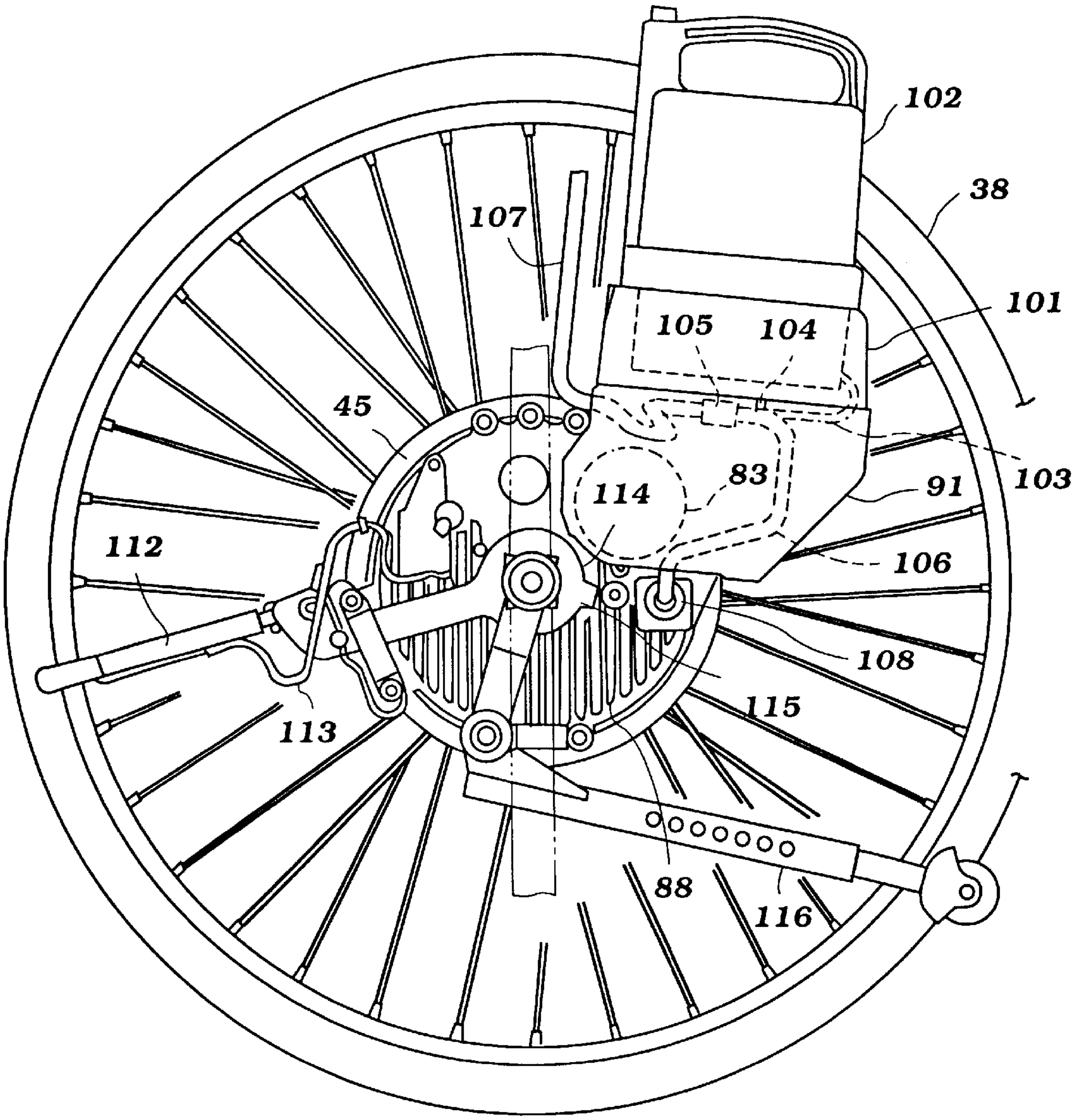
FIG. 11 is a view showing the inner side of one of the wheels and specifically the right-hand wheel of the wheelchair to show the association of the battery and manual control associated therewith.

As may be best seen in FIGS. 2, 3 and 11, the mounting housing 91 associated with the electric motor 89 of the right-hand wheel assembly 38 has an upwardly extending portion 101 that receives a rechargeable electric battery 102. Preferably, the arrangement is such that the battery 102 when placed into the battery case 101 will establish an electrical connection with a conductor 103.

This conductor 103 is coupled to a connector 104 which, in turn, is connected to a further conductor 105 with the conductors 104 and 105 serving respective power cables or wire harnesses 106 and 107. The harness 106 is connected an electrical connector 108 carried by the backing plate 45 of the right-hand wheel and which couples internally to the components as best seen in FIG. 15. In a similar manner, the wire harness 107 extends across the side of the wheel chair and is connected to a further connector 109 by a coupling 111 for supplying both electrical power to the left-hand wheel and also to provide information back to the main controller for the system.

The right-hand wheel carries a main switch that is comprised of a lever 112 which also has an electrical cable 113 that transmits the on-off signals to system. The level 112 has a small sector gear 114 that cooperates with a gear 115 mounted on the backing plate 45 of the right-hand wheel 38. This gear 115 operates a main on-off switch 110.

The conductor 113 transmits an electrical signal to a light-emitting diode (not shown) that is mounted in the forward end of the lever 112 so as to give the rider a visual indication of when the battery connection to the power unit is switched on or off.

Figure 12:
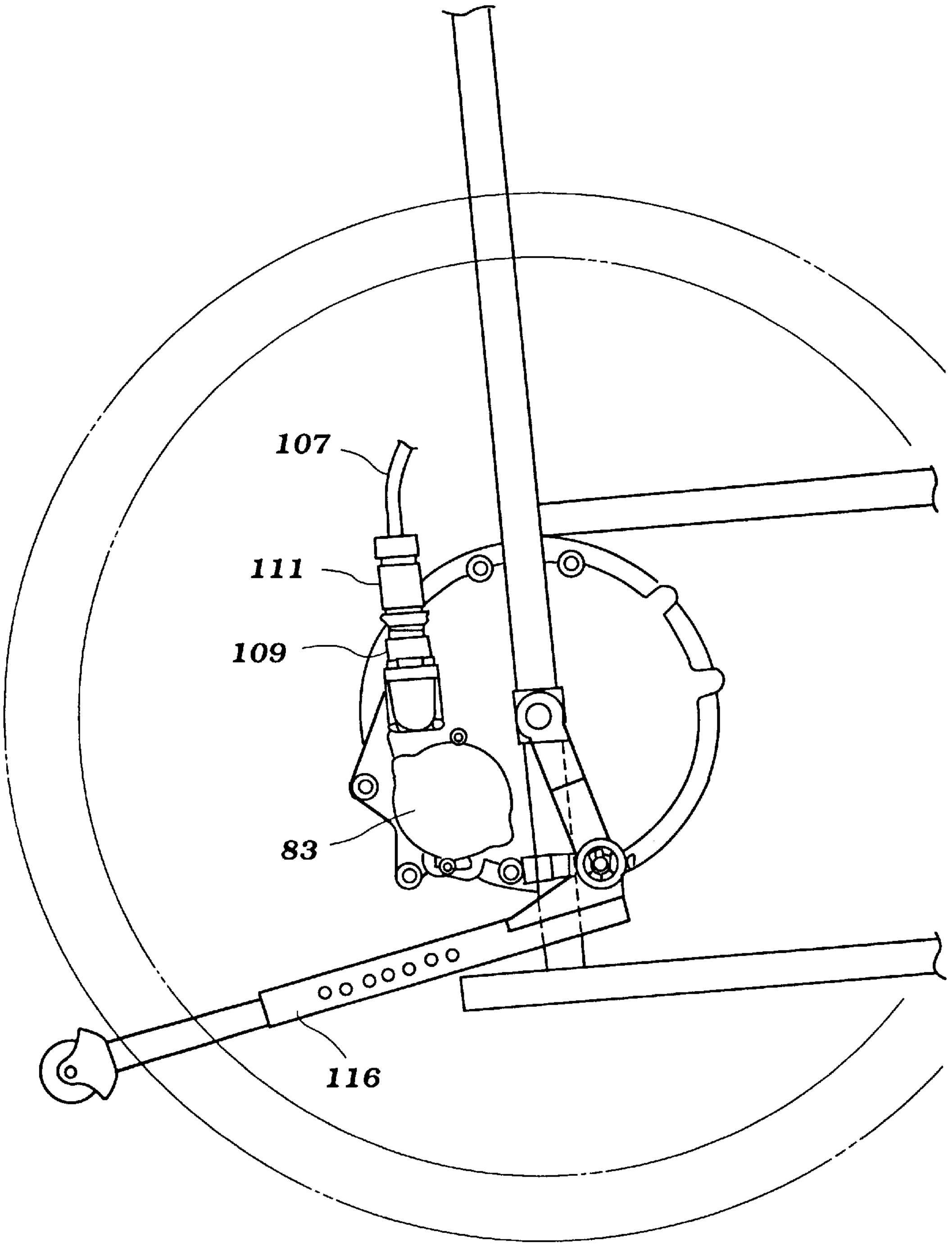
FIG. 12 is a side elevational view, in part similar to FIG. 11, but shows the opposite, i.e., left-hand wheel of the wheelchair.

Also appear in FIGS. 11 and 12, and as is seen in FIG. 1, a pair of safety or helper wheels 116 are carried at each side of the wheel chair 21 so as to ensure that the wheelchair will not tip over when traveling up a steep incline or if a weight is shifted to the rear of the unit by pressing downwardly on the handle bars 27.

Figure 13:
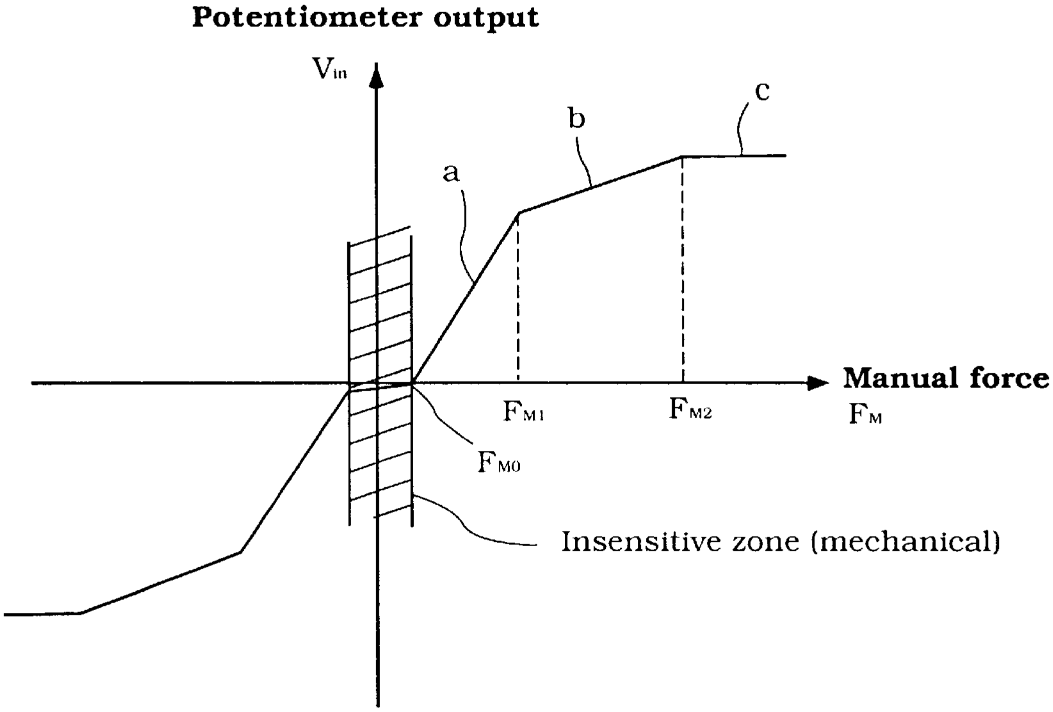
FIG. 13 is a graphical view showing the potentiometer output of the torque sensor in relation to the human power input force in the forward and reverse modes and shows the mechanical insensitive or dead zone.
Figure 14:
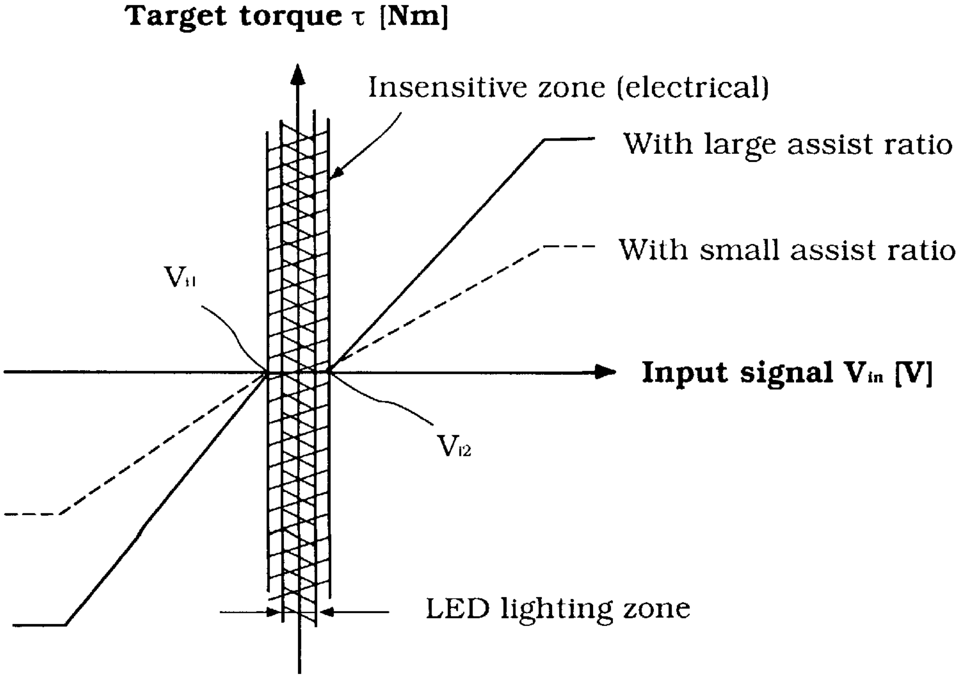
FIG. 14 is a graphical view showing the relationship between human power input and target torque in relation to assist ratio.

The operation of the assist mechanism will now be described by particular reference to FIGS. 13 and 14. FIG. 13 is a view that shows the relationship of the output of the potentiometer 68 Vin in relation to the manual force $F_M$ which is applied by the rider to the hand rims 53.

It should be noted that the biasing spring arrangement, as seen in FIGS. 6 and 7, is such that in the original neutral position, the smaller diameter, lighter spring 64 applies its pre-load pressure to the retainer members 70 while the ends of the larger stiffer spring 63 are spaced from them. Thus, the initial centering force is applied solely by the small lighter spring 64 and there is a set pre-load to these springs. Thus, until the rider places a force equal to the value $F_{M0}$ on the hand rim 53, there will be no compression of the spring 64 and no movement of the potentiometer 68.

However, when the rider's applied force is greater than $F_{M0}$, then initially the small lighter spring 64 will be compressed and the potentiometer output will move up a relatively steep curve indicated at "a" in FIG. 13.

This condition prevails until the rider's applied force is equal to the value $F_{M1}$ at which time compression of the lighter spring 64 will be such that the retainers 70 come into contact and begin to compress the heavier spring 63. Thereafter as the force exerted by the rider increases to the value $F_{M1}$ both springs 63 and 64 will be compressed and the potentiometer output signal will increase, but at a lesser rate than before as seen by the curve portion "b". This is due primarily because of the stiffer spring 63.

By using these two different rate springs, it is possible to obtain very fine control when making small maneuvers and yet adequate control when applying larger forces.

As the force reaches the value $F_{M2}$, the springs 63 and 64 will be compressed sufficiently so that the two retainers 70 will contact each other and, at that time, no further spring compression will occur and the potentiometer output will be constant in the range "c" of FIG. 13.

As seen on the left-hand side of this figure, the same effect will occur when the rider operates in the reverse direction and the potentiometer output curves are indicated by the characters a', b' and c' in this figure.

When the manual force applied is read, the controller 83 operates so as to provide an assist ratio by setting a target torque $\tau$. This may be done with either a larger or small assist ratio, depending upon the condition of the user and the desired result. The broken line curve of FIG. 14 shows a small assist ratio, while the solid line shows a large assist ratio. The small assist ratio is used for stronger people or for any other purpose.

Thus, when this is done, then the electric motor 89 associated with a respective wheel will be energized either by using a varying duty ratio or any other type of control strategy so as to provide the desired power assist in proportion to the manual force applied.

It should be readily apparent that this construction makes it important that the potentiometer 68 is appropriately adjusted by using the screws 75 and slots 74. In order to accomplish adjustment, there is provided a simple indicating or signaling system that is comprised of an LED. The LED is indicated by the reference numeral 117 and is mounted in an appropriate location on the backing plate 45 in proximity to a window 118 formed in the backing plate. If desired, a transparent or translucent cover 119 may be positioned over it. This is located in one of the quadrants defined by the windows 72 and 73, this quadrant being indicated at 121 in FIG. 4. This is preferably a quadrant that can be easily viewed by the person making the adjustment.

From the outer side of the wheel, the LED 117 may be readily viewed by removing the wheel cover 54. Alternatively, if looking at the backside, the LED may be seen through the window 118 and transparent cover 119.

The LED 117 is set so as to illuminate when the output of the potentiometer is zero, but this zone is set so as to be smaller than the insensitive zone of the potentiometer. This is shown by the double hatched area LED lighting zone in FIG. 14.

That is, the way the adjustment is made is that the operator determines when making the adjustment if the LED 117 is illuminated. If it is not, when no force is applied, the screws 75 are loosened and the mounting plate 71 is moved until the LED is illuminated. Once illuminated, the operator will know that the null zone has been set appropriately and the screws 75 are tightened. Thus, it is possible to facilitate ease of adjustment without any special tools or gages.

The controllers 83 are also provided with a self-monitoring system that monitors the electrical circuitry to make sure that the system is operating properly. If, for some reason, there is an irregularity in the operation of the system or, for example, if the charge of the battery 102 becomes depleted, then a warning is given by flashing an additional LED 122 (FIG. 15) and also, so that the rider may be warned, a buzzer 123, shown schematically in this Figure and located at an appropriate location, is sounded. Thus, the system provides very good control and ease of use.

Figure 16:
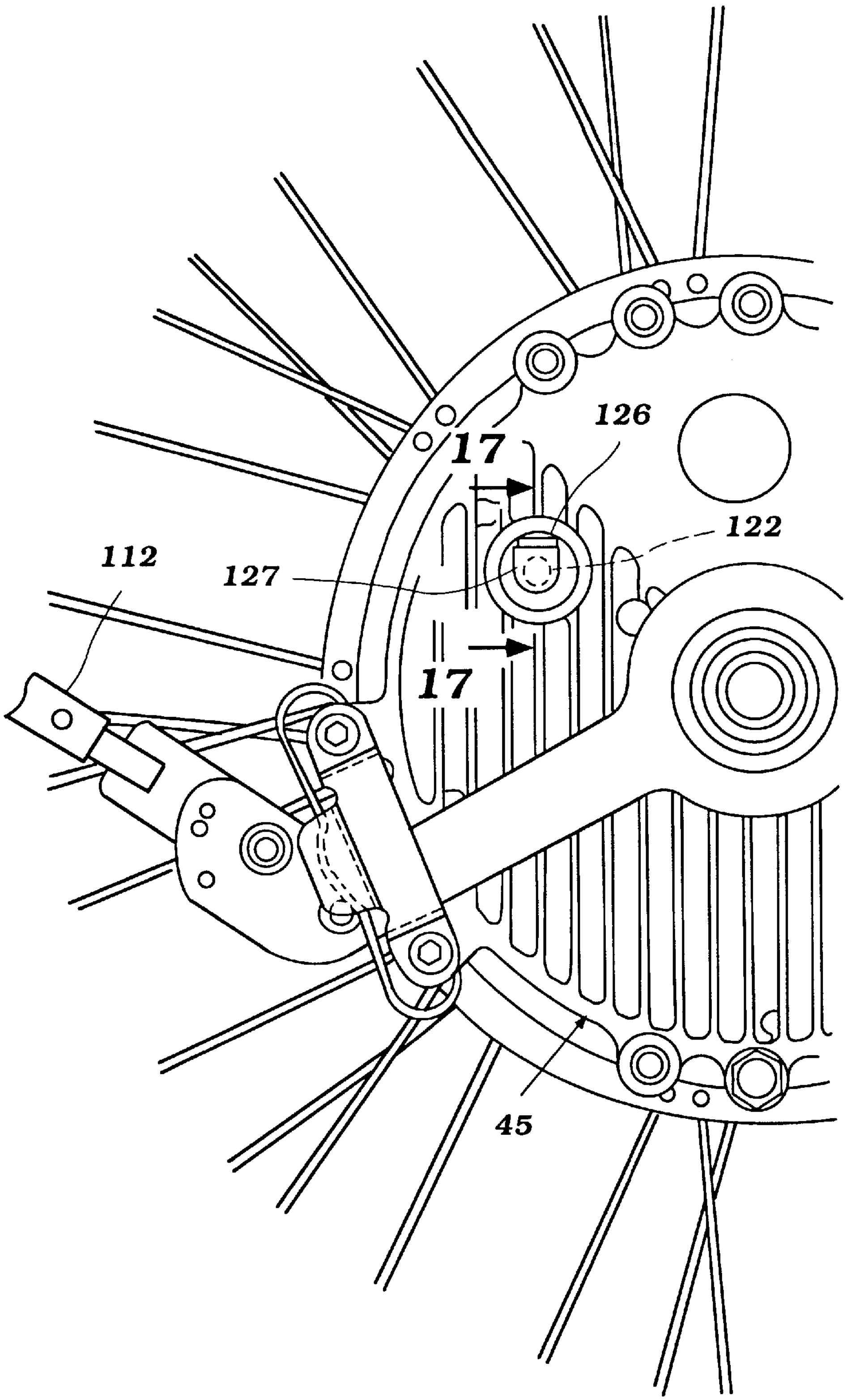
FIG. 16 is an enlarged view, in part similar to FIG. 11, and shows how the condition warning indicator is mounted for ease of viewing.
Figure 17:
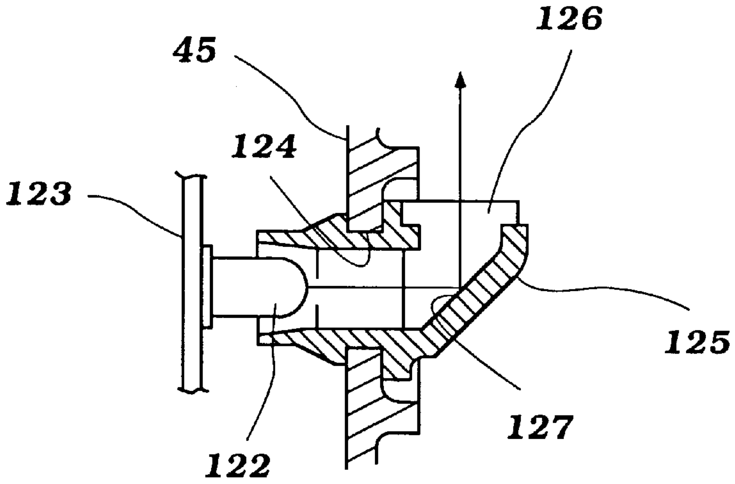
FIG. 17 is an enlarged cross-sectional view taken along the line 17—17 of FIG. 16.

FIGS. 16 and 17 show the way in which the LED 122 may be mounted so as to facilitate its being viewed by the rider. In this case, the LED 122 is mounted on the circuit board of the controller 83 which circuit board is indicated by the reference numeral 123 in a location close to an opening 124 in the backing plate 45. Positioned in this opening 124 is an elastic grommet 125 that has on its inner surface a transparent lens 126 and a reflective area 127 so that the light will be directed upwardly and can be readily seen by the rider seated in the seat. Thus, the condition of the system may be easily monitored from this location.

Figure 18:
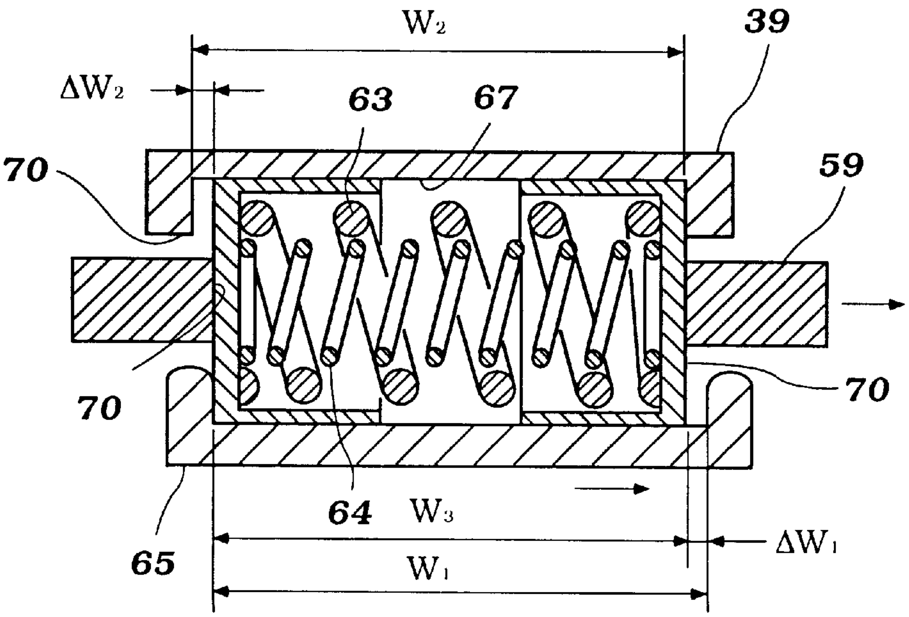
FIG. 18 is an enlarged cross-sectional view, in part similar to FIGS. 6 and 7, and shows how the centering spring adjustment may be made.

FIG. 18 is a view that shows how the centering springs 63 and 64 and their mounting may be easily adjusted. By referring to this figure, it will be seen that the retaining member 65 has a recess for the spring receivers 70 having a width W1. In a similar manner, the backing plate recess 67 that also receives these receivers 70, has a width W2. Finally, the opening 61 in the hand rim disc or hub 59 has a width W3. The relationship is such that W1 is greater than W2 which is greater than W3.

W1>W2>W3

In order to center the assembly, the fasteners 67 are loosened and the spring retainer 65 is shifted in the direction of the arrow shown in FIG. 18 until the retainer member 65 comes into contact with the left-hand side spring retainer 70. The movement is then continued until the right-hand side spring retainer 70 comes into contact with the right-hand side of the backing plate groove 67 as shown in FIG. 18 resulting in a gap ΔW1 on the right-hand side between the retaining member 65 and the spring retainer 70 and a gap ΔW2 occurs between the left-hand side spring retainer 70 and the backing plate recess 67.

The device is then locked in place at that time. In this way, the pre-load is set on the springs by the dimension W3 of the hand rim and the other positions can be relatively insensitive without affecting the seating.

Thus, from the foregoing description, it should be readily apparent that the described construction permits ease of adjustment of the fourth sensor and the biasing spring arrangement that cooperates with it. This can be done easily without special tools or gages, and also permits the rider to receive indications of the operativeness of the system and its condition. In addition, the adjusting mechanism facilitates the mounting of the hand rim so that it will not bind or wobble.

Of course, the foregoing description is that of preferred embodiments of the invention, and various changes and modifications may be made without departing from the spirit and scope of the invention, as defined by the appended claims.

What is claimed is:

1. A manually-powered, prime mover-assisted, vehicle comprised of a body portion adapted to accommodate as least one rider, a driving element carried by said body portion and cooperable with the terrain of which said vehicle travels for generating a driving force through cooperation with the terrain, a manual input force device carried by said body portion for receiving a manual force applied by a rider of said vehicle, a first transmission coupling said manual force input device to said driving element for manually powering said vehicle along the terrain, a prime mover carried by said body portion and driving said driving element through a second transmission for providing a power assist to the manual input force, a manual force sensor for sensing the manual force applied by said rider to said manual force input device, a controller for operating said prime mover in response to the sensed manual force for controlling said prime mover to provide a controlled degree of power assist for powering said vehicle, said manual force sensor having a null area and being detachably mounted to a component of the vehicle with which it is associated, a display arrangement carried by said vehicle for providing an indication when said manual force sensor is mounted in the desired null position on its supporting component for facilitating adjustment therefor.

2. A manually-powered, prime mover-assisted vehicle as set forth in claim 1, wherein the display arrangement provides a signal when the force sensor output signal is zero.

3. A manually-powered, prime mover-assisted vehicle as set forth in claim 2, wherein the display signal operates over a narrower range than the null area of the manual force sensor.

4. A manually-powered, prime mover-assisted vehicle as set forth in claim 1, wherein the display arrangement also gives a signal of the condition of the control.

5. A manually-powered, prime mover-assisted vehicle as set forth in claim 4, wherein at least one of the signals from the display is viewable by a rider in the body portion.

6. A manually-powered, prime mover-assisted vehicle as set forth in claim 5, wherein at least one of the signals is a signal from a light source.

7. A manually-powered, prime mover-assisted vehicle as set forth in claim 6, wherein the light source emits light generally in a direction perpendicularly to the direction of travel.

8. A manually-powered, prime mover-assisted vehicle as set forth in claim 7, further including light deflecting means for directing the light from the light source in a generally upward direction.

9. A manually-powered, prime mover-assisted vehicle as set forth in claim 4, wherein at least one of the signals from the display is viewable from a side facing the point where the null position adjustment is made.

10. A manually-powered, prime mover-assisted vehicle as set forth in claim 9, wherein the one of the signals from the display is viewable on the same side of the driven element from which the null position adjustment is made.

11. A manually-powered, prime mover-assisted vehicle as set forth in claim 1, wherein the vehicle is a wheeled vehicle and the driving element comprises a wheel.

12. A manually-powered, prime mover-assisted vehicle as set forth in claim 11, wherein the wheeled vehicle comprises a wheelchair and wherein the manual force input device comprises a hand rim associated with the driving wheel.

13. A manually-powered, prime mover-assisted vehicle as set forth in claim 12, wherein the hand rim is supported for limited relative rotation relative to the associated driving wheel by the first transmission and the manual force sensor measures the degree of relative movement.

14. A manually-powered, prime mover-assisted vehicle as set forth in claim 13, wherein at least one of the signals from the display is viewable from a side facing the wheel.

15. A manually-powered, prime mover-assisted vehicle as set forth in claim 14, wherein the one of the signals from the display is viewable on the same side of the wheel from which the null position adjustment is made.

16. A manually-powered, prime mover-assisted vehicle as set forth in claim 13, wherein the sensor comprises a potentiometer.

17. A manually-powered, prime mover-assisted vehicle as set forth in claim 16, wherein the prime mover comprises an electric motor.

18. A manually-powered, prime mover-assisted vehicle as set forth in claim 13, further including a plurality of biasing spring arrangements for yieldably resisting the relative rotation.

19. A manually-powered, prime mover-assisted vehicle as set forth in claim 13, further including a plurality of circumferentially spaced, axially adjustable bearing elements spaced around the wheel and engaging the hand rim for limiting the axial defletion of said hand rim relative to said wheel.

20. A manually-powered, prime mover-assisted vehicle as set forth in claim 18 wherein each of the biasing spring arrangements is adjustable for adjusting the preload in the spring.

21. A manually-powered, prime mover-assisted vehicle as set forth in claim 20, wherein the biasing spring arrangement includes a first member fixed relative to one of the hand rim and the associated driving wheel in defining a first gap, a second member affixed relative to the other of the hand rim and the driving wheel and defining a second gap, at least one of said members being adjustable circumferentially relative to the hand wheel or driving wheel to which it is affixed, said hand rim defining a gap extending between said members and in abutting engagements with the opposite end of said biasing spring arrangement and defining a third gap and wherein the third gap is smaller than the first and second gaps.

22. A manually-powered, prime mover-assisted vehicle as set forth in claim 21, wherein the biasing spring arrangements each comprise a pair of coil springs having different diameters.

23. A manually-powered, prime mover-assisted, wheelchair comprised of a body portion adapted to accommodate as least one rider, a driving wheel carried by said body portion and cooperable with the ground over which said vehicle travels for generating a driving force through cooperation with the terrain, a hand wheel carried by wheel for receiving a manual force applied by a rider of said wheelchair, a lost motion connection coupling said hand wheel to said wheel for manually powering said wheelchair along the ground, a prime mover carried by said body portion and driving said wheel through a transmission for providing a power assist to the manual input force, a manual force sensor for sensing the manual force applied by said rider to said hand wheel, a controller for operating said prime mover in response to the sensed manual force for controlling said prime mover to provide a controlled degree of power assist for powering said wheelchair, and a plurality of circumferentially spaced, axially adjustable bearing elements spaced around said driving wheel and engaging said hand rim for limiting the axial deflection of said hand rim relative to said driving wheel.

* * * * *